United States Patent
Geng

(10) Patent No.: US 9,210,565 B2
(45) Date of Patent: Dec. 8, 2015

(54) MULTICAST CONTROL METHOD AND APPARATUS

(71) Applicant: Huawei Technologies Co., Ltd., Guangdong (CN)

(72) Inventor: Libo Geng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 526 days.

(21) Appl. No.: 13/632,933

(22) Filed: Oct. 1, 2012

(65) Prior Publication Data
US 2013/0028164 A1 Jan. 31, 2013

Related U.S. Application Data

(63) Continuation of application No. PCT/CN2011/072299, filed on Mar. 30, 2011.

(30) Foreign Application Priority Data

Apr. 7, 2010 (CN) .......................... 2010 1 0142061

(51) Int. Cl.
*H04J 3/24* (2006.01)
*H04W 8/18* (2009.01)
(Continued)

(52) U.S. Cl.
CPC ............... *H04W 8/186* (2013.01); *H04W 4/06* (2013.01); *H04W 28/06* (2013.01); *H04W 76/002* (2013.01); *H04W 84/12* (2013.01); *H04W 88/08* (2013.01)

(58) Field of Classification Search
CPC ......... H04L 2012/5608; H04W 84/12; H04W 88/08; H04W 4/06; H04W 80/04; H04W 88/06; H04W 84/18; H04W 8/186; H04W 76/002; H04J 3/24

USPC ....................... 370/310.2, 312, 328, 338, 349
See application file for complete search history.

(56) References Cited

U.S. PATENT DOCUMENTS 7,873,020 B2 * 1/2011 Hunt et al. .................... 370/338
7,996,554 B1 * 8/2011 Venkatraman ................ 709/232
(Continued)

FOREIGN PATENT DOCUMENTS

| CN | 1976270 A | 6/2007 |
|---|---|---|
| CN | 101166194 A | 4/2008 |

(Continued)

OTHER PUBLICATIONS

International Search Report dated Jul. 7, 2011 in connection with International Patent Application No. PCT/CN2011/072299.

(Continued)

*Primary Examiner* — Brenda H Pham

(57) ABSTRACT

In a multicast control method, when an SSID or a BSSID of a specified VAP that will be delivered to an access point AP enables a multicast control function, an AC sends to the AP a CAPWAP multicast control message that includes multicast control enabling information, so that the AP creates a multicast control table according to the CAPWAP multicast control message that includes the multicast control enabling information and performs multicast control according to the multicast control table. With the method, the AC is responsible for delivering a multicast control policy to the AP, and the AP implements multicast replication and WLAN station rights control, which relieves the multicast control and multicast replication pressure on the AC effectively, improves the utilization of the network bandwidth, and overcomes the operator's difficulties in meeting multicast service requirements in the WLAN thoroughly.

24 Claims, 10 Drawing Sheets

(51) Int. Cl.
*H04W 4/06* (2009.01)
*H04W 28/06* (2009.01)
*H04W 84/12* (2009.01)
*H04W 88/08* (2009.01)
*H04W 76/00* (2009.01)

(56) References Cited

U.S. PATENT DOCUMENTS

| | | | |
|---|---|---|---|
| 8,055,264 B2 * | 11/2011 | Yao et al. | 455/436 |
| 8,144,707 B2 * | 3/2012 | Zhang et al. | 370/390 |
| 2004/0210927 A1 | 10/2004 | Bahr et al. | |
| 2008/0181161 A1 | 7/2008 | Gi Kim et al. | |
| 2009/0086689 A1 | 4/2009 | Hunt et al. | |
| 2009/0252165 A1 | 10/2009 | Zhang et al. | |
| 2011/0103284 A1 * | 5/2011 | Gundavelli et al. | 370/312 |

FOREIGN PATENT DOCUMENTS

| | | |
|---|---|---|
| CN | 101222388 A | 7/2008 |
| CN | 101562613 A | 10/2009 |
| CN | 101568069 A | 10/2009 |

OTHER PUBLICATIONS

Partial translation of Office Action dated Feb. 28, 2013 in connection with Chinese Patent Application No. 201010142061.3.

Written Opinion of the International Searching Authority dated Jul. 7, 2011 in connection with International Patent Application No. PCT/CN2011/072299.

Supplementary European Search Report dated Dec. 19, 2012 in connection with European Patent Application No. EP 11 76 5032.

P. Calhoun, et al., "Control and Provisioning of Wireless Access Points (CAPWAP) Protocol Binding for IEEE 802.11", Network Working Group, Mar. 2009, 76 pages.

Partial Translation of Chinese Office Action in connection with Chinese Patent Application No. CN101562613A, 2 pages.

Partial Translation of Chinese Office Action in connection with Chinese Patent Application No. CN101222388A, 1 page.

Partial Translation of Chinese Office Action in connection with Chinese Patent Application No. CN101166194A, 4 pages.

Partial Translation of Chinese Office Action in connection with Chinese Patent Application No. CN101568069A, 4 pages.

* cited by examiner

MULTICAST CONTROL METHOD AND APPARATUS

CROSS-REFERENCE TO RELATED APPLICATIONS

This application is a continuation of International Application No. PCT/CN2011/072299, filed on Mar. 30, 2011, which claims priority to Chinese Patent Application No. 201010142061.3, filed on Apr. 7, 2010, both of which are hereby incorporated by reference in their entireties.

TECHNICAL FIELD

The present disclosure relates to the network field, and in particular, to a multicast control method and apparatus.

BACKGROUND

A WLAN (Wireless Local Area Network, wireless local area network) is a computer local area network that uses a radio channel as a transmission medium, and is an important supplement and extension to a wired network. The basic network structure of the WLAN includes three network devices: station (STA, Station), access point (AP, Access Point), and access control point (AC, Access Control).

The function of the AP is to connect the stations to the existing wired network. With the constant application of the WLAN technology, more and more APs are deployed in the network. The version upgrade and the configuration management of the APs result in a high operating expenditure of an operator. To reduce the operating expenditure of the network, the operator expects to control and manage APs through the access control point AC in a centralized way, which gives rise to a WLAN network of thin APs.

A tunnel is set up between the thin AP and the AC through a CAPWAP (Control And Provisioning of Wireless Access Point, control and provisioning of wireless access point) protocol, and the AC manages thin APs through the CAPWAP protocol. Data is transmitted between the WLAN station STA and the thin AP through 802.11 frames. The thin AP converts the 802.11 frames of the WLAN station STA into a frame format identifiable by the AC, and sends them to the AC.

FIG. 1 is a sequence chart of a thin AP implementing WLAN user access. Referring to FIG. 1, the CAPWAP link between the AP and the AC provides normal communication through the steps such as (1) capwap_discovery and (2) capwap_configuration; the WLAN station STA sends an association request (association_req) frame to the thin AP, and the thin AP sends a capwap_req_association message to the AC, requesting the AC to confirm whether the WLAN station is allowed to be associated; the AC makes a determination, and delivers a capwap_resp_association message to the AP if the association is allowed, and the AP sends an association response (association_resp) frame to the WLAN station to indicate that the association is allowed, which means that a wireless link is set up successfully between the WLAN station and the AP. Afterward, the WLAN station can start access authentication. After the authentication is passed, the WLAN station can start to play a video on demand. The multicast service is an important content of carrying out the WLAN service. The multicast service rights control is a primary breakthrough point for the operator to deploy the multicast service of the WLAN network. To obtain the multicast data in a video-on-demand process, the WLAN station needs to obtain the play on-demand rights first.

While the WLAN station plays a multicast video on demand in the prior art, the AP transmits the IGMP (Internet Group Management Protocol, Internet Group Management Protocol) request message of each WLAN station to the AC transparently. After receiving the IGMP request message, the AC determines the multicast program rights of the WLAN station according to a preset multicast control policy. If the WLAN station is allowed to play the multicast program, the AC replicates a multicast stream for the WLAN station, and forwards the multicast stream to the WLAN station through the AP. The destination MAC (Media Access Control, media access control) address of the multicast stream is the MAC address of the WLAN station, and the destination IP address of the multicast stream is the IP address of a multicast group. After receiving the multicast program stream, the AP uses the pre-agreed multicast key to encrypt the multicast program stream and then sends the multicast program stream to the WLAN station.

FIG. 2 is a schematic diagram of an on-demand multicast process of a WLAN station in the prior art. Referring to FIG. 2, in the process of implementing the present disclosure, the inventor finds that because the AC is responsible for multicast rights control, the AP forwards the IGMP REPORT (report) message to the AC directly after receiving the message from the WLAN station, and the AC decides whether to allow the WLAN station to play the specified multicast stream on demand according to a preset multicast control policy. The AC replicates a multicast stream for each permitted WLAN station. The technical solution in the prior art causes the following problems: the multicast replication node of the WLAN station is the AC device, which leads to serious waste of downlink bandwidths and too heavy multicast replication pressure on the AC device; the multicast control node of the WLAN station is the AC device, which leads to too centralized loads on the AC device; every IGMP protocol message of the WLAN station is forwarded by the AP to the AC, which leads to waste of some uplink bandwidths.

SUMMARY

Embodiments of the present disclosure provide a multicast control method and apparatus to avoid waste of uplink and downlink bandwidths between the AP and the AC, and implement distributed replication and distributed multicast rights control of multicast streams.

According to an implementation of an embodiment of the present disclosure:

In one aspect, an embodiment of the present disclosure provides a multicast control method, and the method includes: when a service set identifier SSID or a basic service set identifier BSSID of a specified virtual access point VAP that will be delivered to an access point AP enables a multicast control function, sending, by an access control point AC, to the access point AP a control and provisioning of wireless access point CAPWAP multicast control message that includes multicast control enabling information, so that the AP creates a multicast control table according to the CAPWAP multicast control message that includes the multicast control enabling information, and performs multicast control according to the multicast control table.

In another aspect, an embodiment of the present disclosure provides a multicast control apparatus, and the apparatus includes: a first determining unit, configured to determine whether an SSID or a BSSID of a specified VAP that will be delivered to an AP enables controllable multicast; and a first sending unit, configured to: if the first determining unit determines that the SSID or the BSSID of the specified VAP that will be delivered to the AP enables the controllable multicast, send to the AP a CAPWAP multicast control message that includes multicast control enabling information, so that the AP creates a multicast control table according to the CAPWAP multicast control message that includes the multicast control enabling information, and performs multicast control according to the multicast control table.

In still another aspect, an embodiment of the present disclosure further provides an access control point device, and the access control point device includes the multicast control apparatus.

According to another implementation of an embodiment of the present disclosure:

In one aspect, an embodiment of the present disclosure provides a multicast control method, and the method includes: receiving, by an AP, a CAPWAP multicast control message sent by an AC; creating, by the AP, a multicast control table according to the CAPWAP multicast control message; and performing, by the AP, multicast control according to the multicast control table.

In another aspect, an embodiment of the present disclosure provides a multicast control apparatus, and the apparatus includes: a receiving unit, configured to receive a CAPWAP multicast control message sent by an AC; a creating unit, configured to create a multicast control table according to the CAPWAP multicast control message; and a controlling unit, configured to perform multicast control according to the multicast control table.

In still another aspect, an embodiment of the present disclosure further provides an access point device, and the access point device includes the multicast control apparatus.

With the method and the apparatus in the embodiments of the present disclosure, the AC is responsible for delivering the multicast control policy to the AP, and the AP implements multicast replication and WLAN station rights control, thereby avoiding waste of uplink and downlink bandwidths between the AP and the AC and implementing distributed replication and distributed multicast rights control of multicast streams.

BRIEF DESCRIPTION OF THE DRAWINGS

The accompanying drawings outlined below enable better understanding of the present disclosure, and are part of this application but shall not be construed as a limitation on the present disclosure. In the drawings.

DETAILED DESCRIPTION

To make the objectives, technical solutions, and advantages of the embodiments of the present disclosure clearer, the following describes the embodiments of the present disclosure in detail with reference to accompanying drawings. The exemplary embodiments of the present disclosure and the description thereof are illustrative in nature, and shall not be construed as limitations on the present disclosure.

Figure 1:
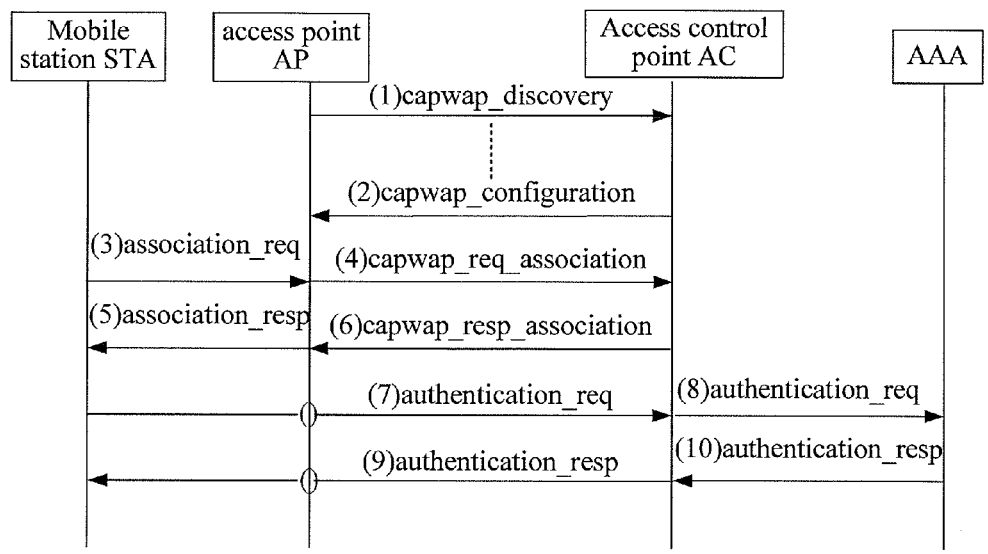
FIG. 1 is a sequence chart of a thin AP implementing WLAN user access.
Figure 2:
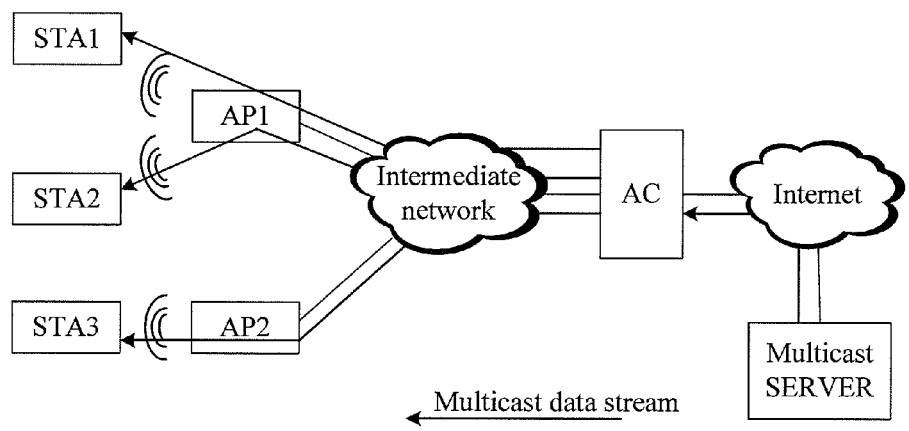
FIG. 2 is a schematic diagram of an on-demand multicast process of a WLAN station in the prior art.
Figure 3:
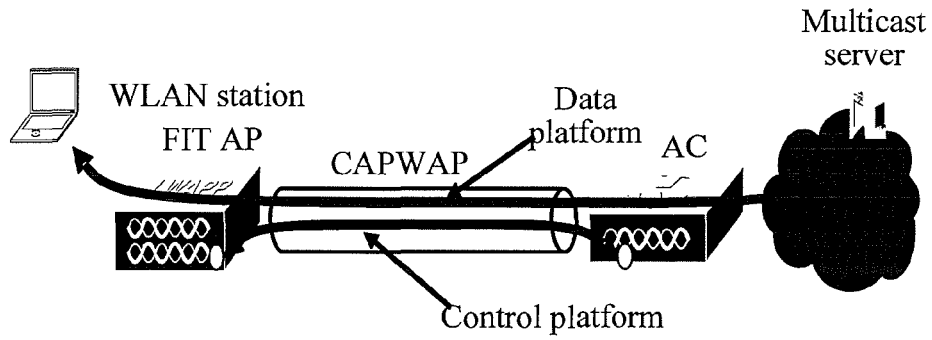
FIG. 3 is a schematic diagram of a basic network structure of thin APs in a WLAN.

FIG. 3 is a schematic diagram of a basic network structure of thin APs in a WLAN. Referring to FIG. 3, a CAPWAP link is created between the AP and the AC, and the AC manages the APs through the CAPWAP link in a centralized way. In this embodiment, the AP deploys an IGMP Proxy (proxy) or IGMP Snooping (snooping), and the AC deploys layer 3 multicast.

Figure 4:
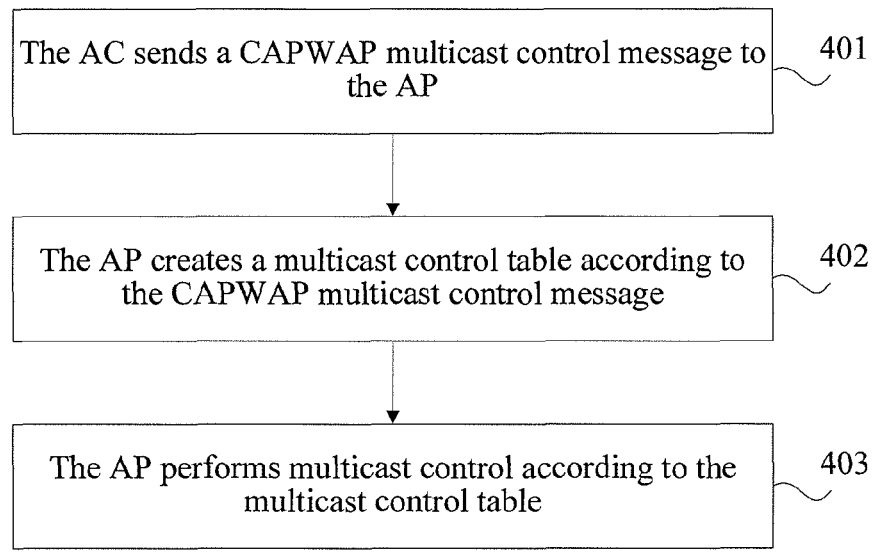
FIG. 4 is a flowchart of a multicast control method according to an embodiment of the present disclosure.

FIG. 4 is a flowchart of a multicast control method provided in an embodiment of the present disclosure. In the method in this embodiment, the AC delivers a multicast control policy to the AP, and the AP performs multicast control according to the multicast control policy of the AC, namely, a CAPWAP multicast control message delivered by the AC. Referring to FIG. 4, the method includes:

401. The AC sends a CAPWAP multicast control message to the AP.

In this embodiment, after a CAPWAP link is created between the AP and the AC, according to local configuration, the AC determines whether a BSSID (Basic Service Set Identifier, basic service set identifier) of a specified VAP (Virtual Access Point, virtual access point) or an SSID (Service Set Identifier, service set identifier) that will be delivered to the AP, needs to enable controllable multicast, namely, perform multicast control through the AP according to the method in this embodiment. If the controllable multicast needs to be enabled, the AC sends a CAPWAP multicast control message to the AP. The local configuration refers to the multicast control policy configured by an AC administrator or operator.

402. The AP creates a multicast control table according to the CAPWAP multicast control message.

In this embodiment, to perform multicast control, the AP creates the corresponding multicast control table according to the CAPWAP multicast control message delivered by the AC. In the multicast control process, the AC may update the accessible multicast group address, or give up the multicast control policy of certain SSIDs. Therefore, the AP modifies or deletes the created multicast control table according to the CAPWAP multicast control message delivered by the AC, so as to create different multicast control tables for performing multicast control, which will be described in the following embodiments respectively.

403. The AP performs multicast control according to the multicast control table.

In this embodiment, after the multicast control table is created according to step 402, the AP may perform multicast control according to the multicast control policy in the multicast control table to implement multicast replication and WLAN station right control. For example, after receiving an IGMP REPORT message from the WLAN station, according to the SSID or BSSID that the message is in and the multicast group address of the message, the AP performs corresponding multicast control by searching the created multicast control table, which will be detailed in the following embodiments.

With the method in this embodiment, the AC is responsible for delivering the multicast control policy to the AP, and the AP implements multicast replication and WLAN station right control, thereby avoiding waste of uplink and downlink bandwidths between the AP and the AC and implementing distributed replication and distributed multicast right control of multicast streams.

Figure 5:
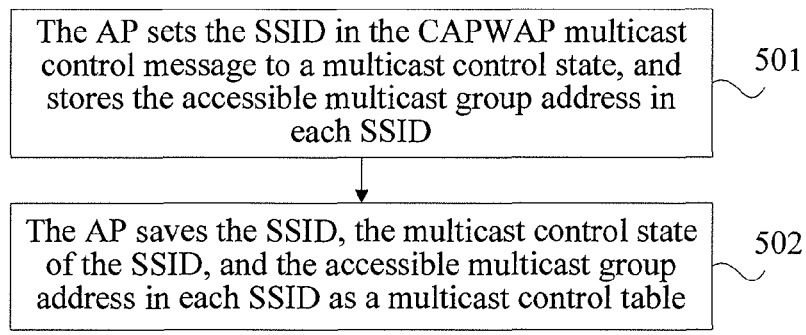
FIG. 5 and FIG. 6 are flowcharts of creating a multicast control table.

In an embodiment, a method shown in FIG. 5 that the AP creating a multicast control table according to the CAPWAP multicast control message may be implemented. Referring to FIG. 5, the method includes:

501. The AP sets the SSID in the CAPWAP multicast control message to a multicast control state, and stores the accessible multicast group address in each SSID.

502. The AP saves the SSID, the multicast control state of the SSID, and the accessible multicast group address in each SSID as a multicast control table. The format of the multicast control table is shown in Table 1.

TABLE 1

| SSID_0 | CONTROLLED | MULTICAST_0 |
| | | ... |
| | | MULTICAST_N |
| ... | ... | ... |
| | | ... |
| SSID_N | CONTROLLED | MULTICAST_0 |
| | | ... |
| | | MULTICAST_N |

By now, the AP has created a multicast control table according to the multicast control policy of the AC, and can perform the corresponding multicast control such as multicast replication and WLAN station right control according to the multicast control table, thereby avoiding waste of uplink and downlink bandwidths between the AP and the AC, implementing distributed replication and distributed multicast rights control of multicast streams, and relieving the processing load of the AC.

Figure 7A:
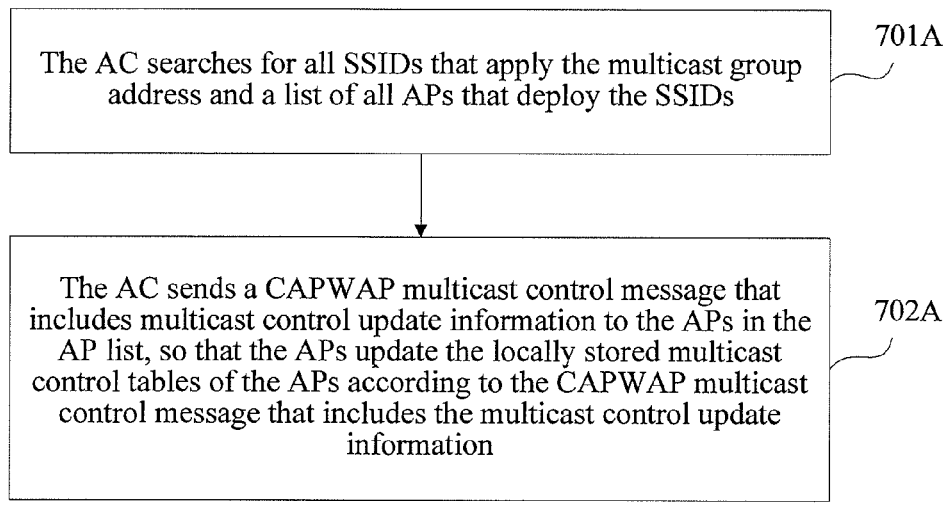
FIG. 7A and FIG. 7B are method flowcharts of updating an accessible multicast group address of an SSID.

In this embodiment, referring to FIG. 7A, when an accessible multicast group address of an SSID needs to be updated, the method in this embodiment includes:

701A. The AC searches for all SSIDs that apply the multicast group address, and a list of all APs that deploy the SSIDs.

702A. The AC sends a CAPWAP multicast control message that includes multicast control update information to the APs in the AP list, so that the APs update the locally stored multicast control tables of the APs according to the CAPWAP multicast control message that includes the multicast control update information.

In an embodiment, the details of the APs updating the locally stored multicast control tables of the APs according to the CAPWAP multicast control message that includes the multicast control update information may be updating the locally stored multicast control tables of the APs according to the SSID in the CAPWAP multicast control message and the accessible multicast group address in each SSID.

Figure 6:
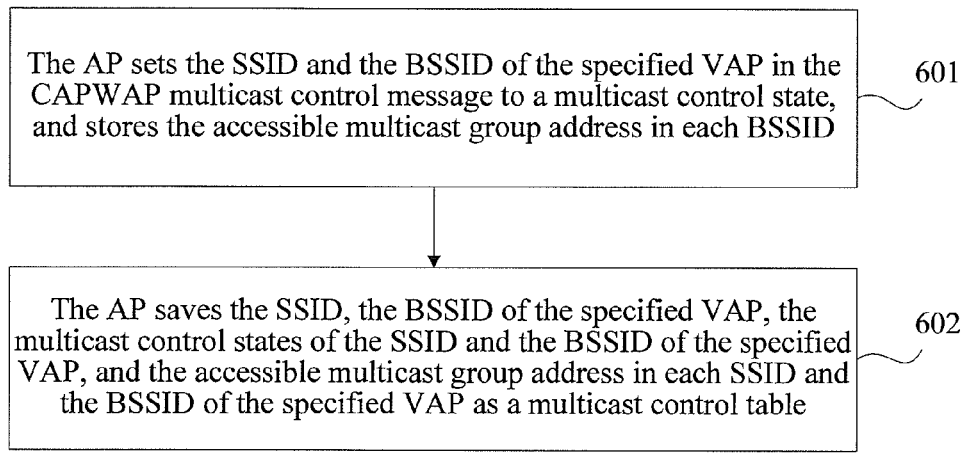

Similarly, in another embodiment, a method shown in FIG. 6 may be used by the AP to create a multicast control table according to the CAPWAP multicast control message. Referring to FIG. 6, the method includes the following:

601. The AP sets the SSID and the BSSID of the specified VAP in the CAPWAP multicast control message to a multicast control state, and stores the accessible multicast group address in the BSSID of each specified VAP.

602. The AP saves the SSID, the BSSID of the specified VAP, the multicast control states of the SSID, and the BSSID of the specified VAP, and the accessible multicast group address in each SSID and the BSSID of the specified VAP as a multicast control table.

By now, the AP has created a multicast control table according to the multicast control policy of the AC, and can perform the corresponding multicast control such as multicast replication and WLAN station rights control according to the multicast control table, thereby avoiding waste of uplink and downlink bandwidths between the AP and the AC, implementing distributed replication and distributed multicast right control of multicast streams, and relieving the processing load of the AC.

Figure 7B:
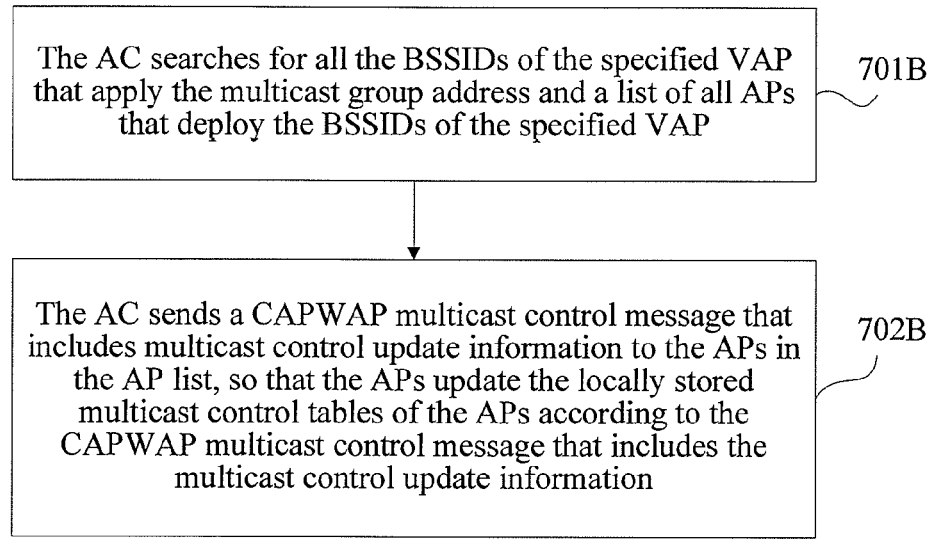

In this embodiment, referring to FIG. 7B, when an accessible multicast group address of a BSSID of a specified VAP needs to be updated, the method in this embodiment includes:

701B. The AC searches for all the BSSIDs of the specified VAP that apply the multicast group address and a list of all APs that deploy the BSSIDs of the specified VAP.

702B. The AC sends a CAPWAP multicast control message that includes multicast control update information to the APs in the AP list, so that the APs update the locally stored multicast control tables of the APs according to the CAPWAP multicast control message that includes the multicast control update information.

Similarly, in another embodiment, the details of the APs updating the locally stored multicast control tables of the APs according to the CAPWAP multicast control message that includes the multicast control update information may be updating the locally stored multicast control tables of the APs according to the SSID and the BSSID of the specified VAP in the CAPWAP multicast control message, and the accessible multicast group address in each SSID and the BSSID of the specified VAP.

If an on-demand right of a multicast group having an SSID or a BSSID of a specified VAP is deleted in the CAPWAP multicast control message, the AP needs to terminate the on-demand service of the multicast group in the SSID or the BSSID of the specified VAP.

In the multicast control method in this embodiment, when the AC needs to update the accessible multicast group address, for example, add a multicast group address or delete a multicast group address, the AC searches for all SSIDs that apply the multicast control policy, and the APs that deploy the SSIDs; or, the AC searches for all the BSSIDs of the specified VAP that apply the multicast control policy, and the APs that deploy the BSSIDs, and sends a CAPWAP multicast control message that includes multicast control update information to the APs, and therefore, the APs update the locally stored multicast control tables accordingly, and apply the updated multicast control policy to perform multicast control. In this way, the application of the multicast control method in this embodiment is extended for the scenario of updating the accessible multicast group address.

Figure 8A:
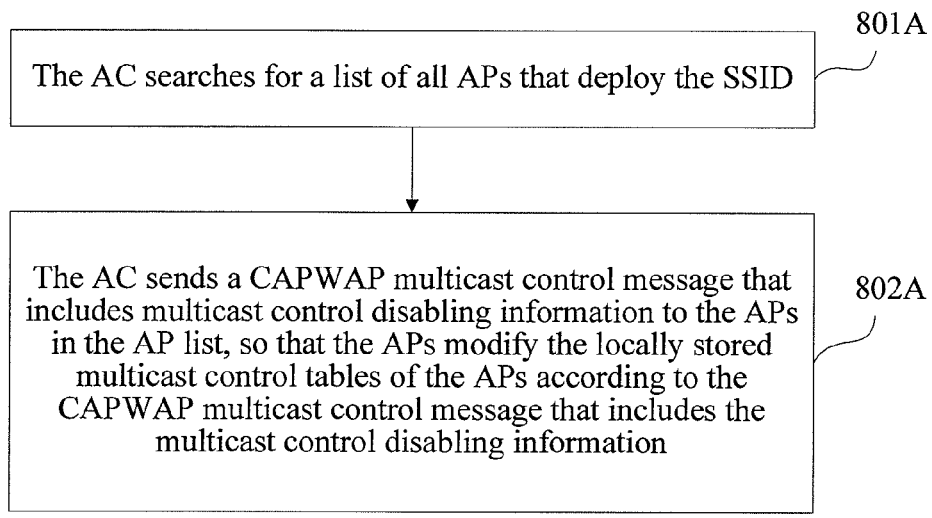
FIG. 8A and FIG. 8B are method flowcharts of disabling a multicast control policy of an SSID.

In this embodiment, referring to FIG. 8A, when a multicast control policy of an SSID needs to be disabled, the method in this embodiment further includes:

801A. The AC searches for a list of all APs that deploy the SSID.

802A. The AC sends a CAPWAP multicast control message that includes multicast control disabling information to the APs in the AP list, so that the APs modify the locally stored multicast control tables of the APs according to the CAPWAP multicast control message that includes the multicast control disabling information.

In an embodiment, the details of the APs modifying the locally stored multicast control tables of the APs according to the CAPWAP multicast control message that includes the multicast control disabling information may be deleting a control entry corresponding to the SSID in the locally stored multicast control tables of the APs according to the SSID in the CAPWAP multicast control message and the accessible multicast group address in each SSID.

Figure 8B:
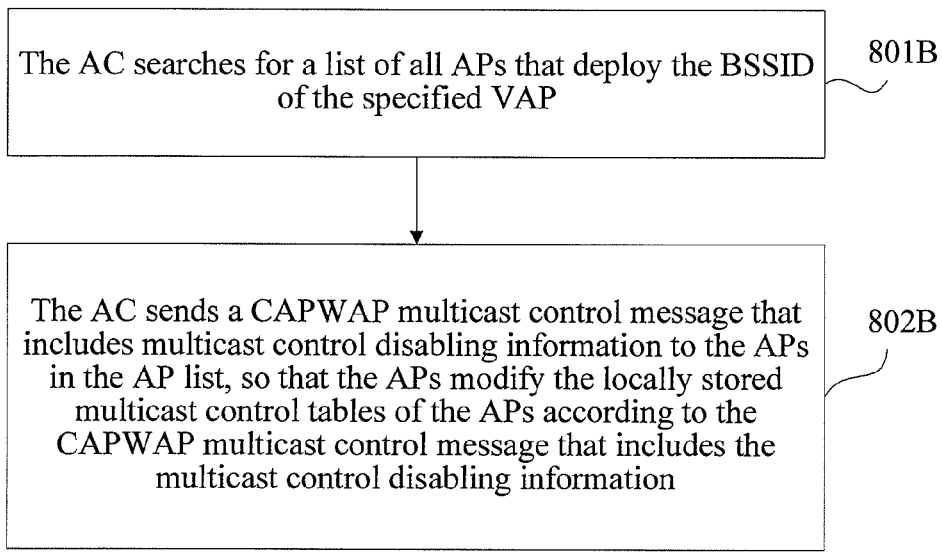

In this embodiment, referring to FIG. 8B, when a multicast control policy of a BSSID of a specified VAP needs to be disabled, the method in this embodiment further includes:

801B. The AC searches for a list of all APs that deploy the BSSID of the specified VAP.

802B. The AC sends a CAPWAP multicast control message that includes multicast control disabling information to the APs in the AP list, so that the APs modify the locally stored multicast control tables of the APs according to the CAPWAP multicast control message that includes the multicast control disabling information.

Similarly, in another embodiment, the details of the APs modifying the locally stored multicast control tables of the APs according to the CAPWAP multicast control message that includes the multicast control disabling information may be deleting a control entry corresponding to the BSSID of the specified VAP in the locally stored multicast control tables of the APs according to the SSID and the BSSID of the specified VAP in the CAPWAP multicast control message, and the accessible multicast group address in each SSID and the BSSID of the specified VAP.

In the multicast control method in this embodiment, when the AC needs to disable the multicast control policy of the SSID or the BSSID of the specified VAP, the AC searches out a list of all the APs that deploy the SSID or the BSSID of the specified VAP, and sends a CAPWAP multicast control message that includes multicast control disabling information to the APs in the AP list, and therefore, the APs delete the control entry corresponding to the SSID or BSSID of the specified VAP in the locally stored multicast control tables accordingly, and perform multicast control by applying the updated multicast control policy or stopping applying the multicast control policy. In this way, the application of the multicast control method in this embodiment is extended for the scenario of deleting the multicast group address.

With the multicast control method in this embodiment, the AC delivers the multicast control policy to the APs, and manages and controls the APs in a centralized way. Therefore, the APs implement multicast control and multicast replication locally, which relieves the multicast control and multicast replication pressure on the AC effectively, improves the utilization of the network bandwidth, and overcomes the operator's difficulties in meeting multicast service requirements in the WLAN thoroughly.

Figure 9:
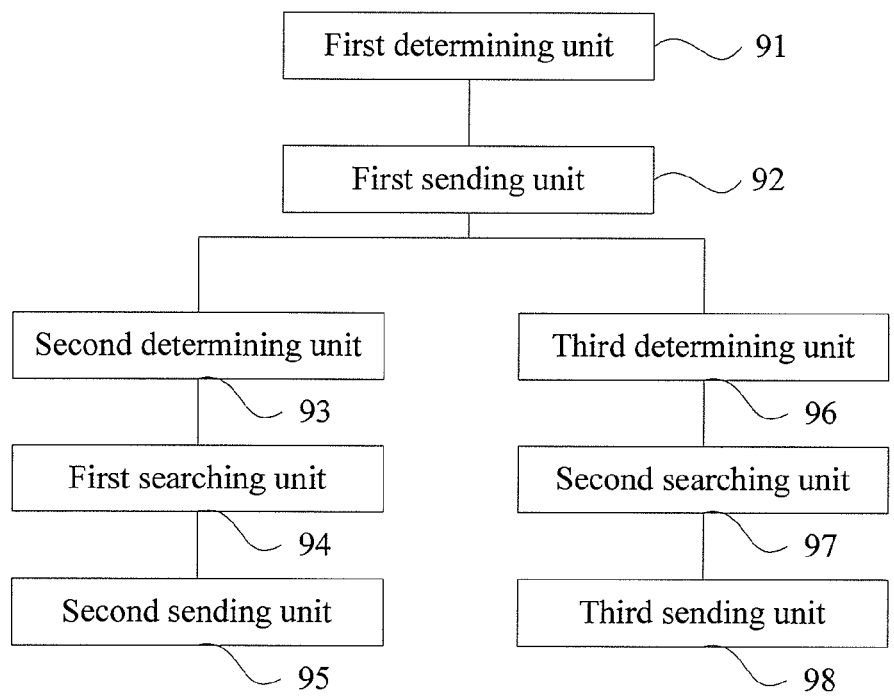
FIG. 9 is a structural block diagram of a multicast control apparatus according to an embodiment of the present disclosure.

FIG. 9 is a structural block diagram of a multicast control apparatus provided in an embodiment of the present disclosure. Referring to FIG. 9, the multicast control apparatus mainly includes:

a first determining unit 91, configured to determine whether an SSID or a BSSID of a specified VAP that will be delivered to an AP needs to enable controllable multicast; and a first sending unit 92, configured to: if the first determining unit 91 determines that the SSID or the BSSID of the specified VAP that will be delivered to the AP needs to enable the controllable multicast, send a CAPWAP multicast control message that includes multicast control enabling information to the AP, so that the AP creates a multicast control table according to the CAPWAP multicast control message that includes the multicast control enabling information, and performs multicast control according to the multicast control table.

In an embodiment, the multicast control apparatus may further include:

a second determining unit 93, configured to determine whether to update an accessible multicast group address of the SSID or an accessible multicast group address of the BSSID of the specified VAP;

a first searching unit 94, configured to: if the second determining unit 93 determines it is necessary to update the accessible multicast group address of the SSID, search for all SSIDs that apply the multicast group address and a list of all APs that deploy the SSIDs; and/or, if the second determining unit 93 determines it is necessary to update the accessible multicast group address of the BSSID of the specified VAP, search for all the BSSIDs of the specified VAP that apply the multicast group address, and a list of all APs that deploy the BSSIDs of the specified VAP; and a second sending unit 95, configured to: send a CAPWAP multicast control message that includes multicast control update information to the APs in the AP list according to the search result of the first searching unit 94, so that the APs update the locally stored multicast control tables of the APs according to the CAPWAP multicast control message that includes the multicast control update information.

In another embodiment, the multicast control apparatus may further include:

a third determining unit 96, configured to determine whether to disable the multicast control policy of the SSID or the multicast control policy of the BSSID of the specified VAP;

a second searching unit 97, configured to: if the third determining unit 96 determines it is necessary to disable the multicast control policy of the SSID, search for a list of all APs that deploy the SSID; and/or, if the third determining unit determines it is necessary to disable the multicast control policy of the BSSID of the specified VAP, search for a list of all APs that deploy the BSSID of the specified VAP; and a third sending unit 98, configured to: send a CAPWAP multicast control message that includes multicast control disabling information to the APs in the AP list according to the search result of the second searching unit 97, so that the APs modify the locally stored multicast control tables of the APs according to the CAPWAP multicast control message that includes the multicast control disabling information.

Each component of the multicast control apparatus in this embodiment implements the corresponding step of the foregoing multicast control method respectively. Because the steps have been detailed in the foregoing embodiment of the multicast control method, they are not described herein.

The multicast control apparatus in the embodiment of the present disclosure is applicable to an AC. The AC delivers the multicast control policy to the APs, and manages and controls the APs in a centralized way. Therefore, the APs implement multicast control and multicast replication locally, which relieves the multicast control and multicast replication pressure on the AC effectively, improves the utilization of the network bandwidth, and overcomes the operator's difficulties in meeting multicast service requirements in the WLAN thoroughly.

Figure 10:
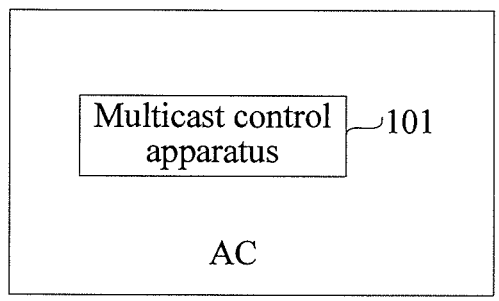
FIG. 10 is a structural block diagram of an access control point device AC according to an embodiment of the present disclosure.

FIG. 10 is a structural block diagram of an access control point device AC provided in an embodiment of the present disclosure. Referring to FIG. 10, the access control point device AC includes a multicast control apparatus 101 in addition to the original components and functions.

In this embodiment, the multicast control apparatus 101 may be the multicast control apparatus in the embodiment shown in FIG. 9. Because the embodiment shown in FIG. 9 has detailed the multicast control apparatus, the multicast control apparatus is not described herein.

Figure 11:
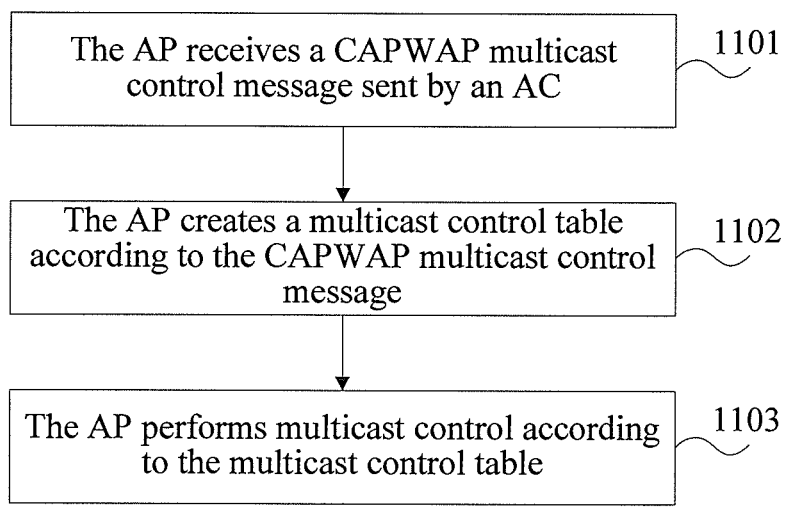
FIG. 11 is a flowchart of a multicast control method according to an embodiment of the present disclosure.

FIG. 11 is a flowchart of a multicast control method provided in an embodiment of the present disclosure. In the description about the method in this embodiment, it is assumed that the AP performs multicast control according to the multicast control policy of the AC, namely, the CAPWAP multicast control message delivered by the AC. In this embodiment, the multicast control is based on the SSID granularity. Referring to FIG. 11, the method includes:

1101. The AP receives the CAPWAP multicast control message sent by the AC.

In this embodiment, after a CAPWAP link is created between the AP and the AC, according to local configuration, the AC determines whether an SSID (Service Set Identifier, service set identifier) that will be delivered to the AP enables controllable multicast, namely, performs multicast control through the AP according to the method in this embodiment. If the controllable multicast needs to be enabled, the AC sends a CAPWAP multicast control message to the AP, as described in the embodiment shown in FIG. 4.

1102. The AP creates a multicast control table according to the CAPWAP multicast control message.

In this embodiment, to perform multicast control, the AP creates the corresponding multicast control table according to the CAPWAP multicast control message delivered by the AC. In the multicast control process, the AC may update the accessible multicast group address, or give up the multicast control policy of certain SSIDs. Therefore, the AP modifies or deletes the created multicast control table according to the CAPWAP multicast control message delivered by the AC, so as to create different multicast control tables for performing multicast control, which will be described in the following embodiments respectively.

1103. The AP performs multicast control according to the multicast control table.

In this embodiment, after the multicast control table is created according to step 1102, the AP may perform multicast control according to the multicast control policy in the multicast control table to implement multicast replication and WLAN station rights control. For example, after receiving an IGMP REPORT message from the WLAN station, according to the SSID that the message is in and the multicast group address of the message, the AP performs corresponding multicast control by searching the created multicast control table, which will be detailed in the following embodiments.

With the method in this embodiment, the AC is responsible for delivering the multicast control policy to the AP, and the AP implements multicast replication and WLAN station rights control, thereby avoiding waste of uplink and downlink bandwidths between the AP and the AC and implementing distributed replication and distributed multicast rights control of multicast streams.

Figure 12:
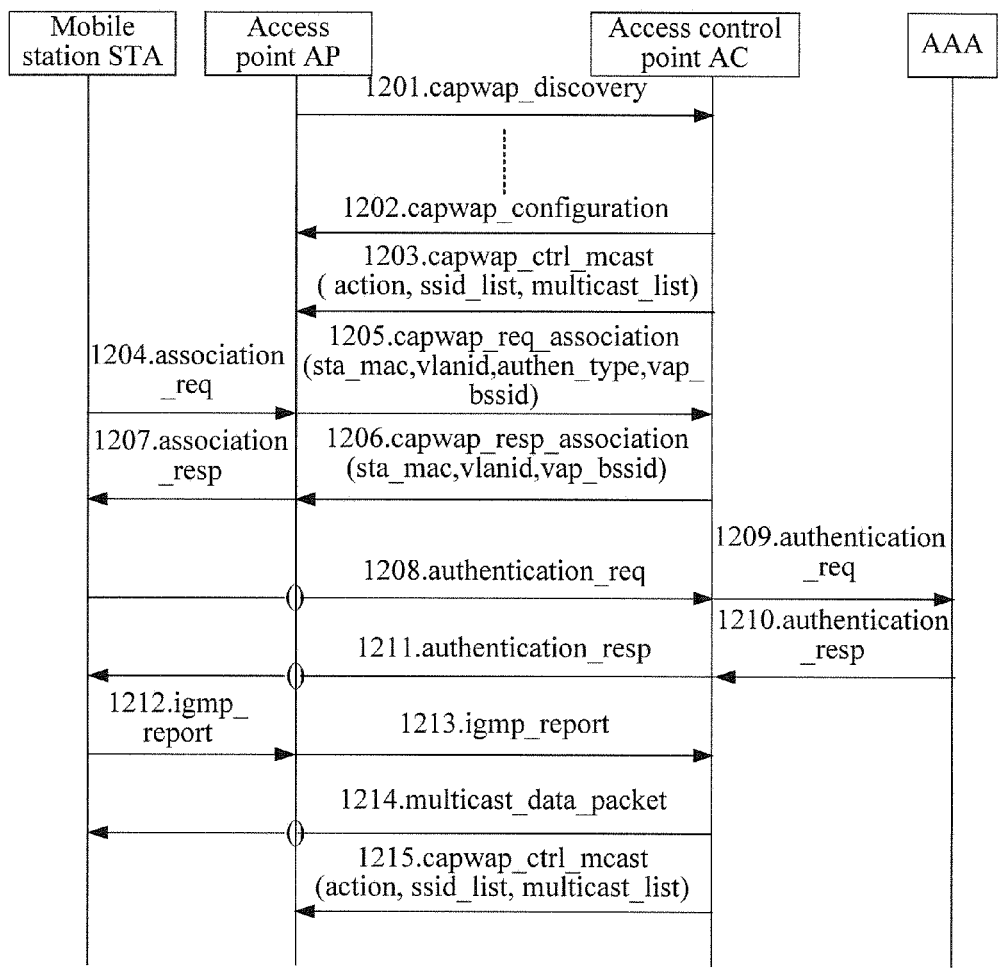
FIG. 12 is a sequence chart of multicast control according to an embodiment of the present disclosure.

FIG. 12 is a sequence chart of multicast control according to an embodiment of the multicast control method shown in FIG. 11. Referring to FIG. 12, the procedure includes the following:

1201-1202. The AP and the AC create a CAPWAP link between them.

1203. The AC delivers a CAPWAP multicast control message to the AP.

In this embodiment, after a CAPWAP link is created between the AP and the AC, according to local configuration, the AC determines whether an SSID that will be delivered to the AP enables controllable multicast. If the controllable multicast is enabled, the AC sends a CAPWAP multicast control message to the AP. The setting of the value of the CAPWAP multicast control message element is shown in Table 2:

TABLE 2

| ACTION | Enable multicast control |
|---|---|
| SSID_0 | SSID_0 for which multicast control is enabled |
| MULTICAST_LIST_0 | Accessible multicast group address 0 |
| ... | ... |
| SSID_N | SSID_N for which multicast control is enabled |
| MULTICAST_LIST_N | Accessible multicast group address N |

In this embodiment, the CAPWAP multicast control message includes not only multicast control enabling information ACTION, but also a service set identifier (SSID) and a multicast list MULTICAST LIST. Both the SSID and the MULTICAST LIST are IP address tables. Because multiple SSIDs may be set for one AP device, and the WLAN station accessed by each SSID has different video programs accessible, the CAPWAP multicast control message may include multiple SSIDs and MULTICAST LISTs.

In this embodiment, after receiving the CAPWAP multicast control message, the AP sets the SSID in the CAPWAP multicast control message to a multicast control state according to the multicast control enabling information included in the CAPWAP multicast control message, and stores the accessible multicast group address of the SSID. In this way, a multicast control table is created, namely, the SSID, the multicast control state of the SSID, and the accessible multicast group address in each SSID are saved as a multicast control table, as shown in Table 3:

TABLE 3

| SSID_0 | CONTROLLED | MULTICAST_0 |
|---|---|---|
|  |  | ... |
|  |  | MULTICAST_N |
| ... | ... | ... |
|  |  | ... |
| SSID_N | CONTROLLED | MULTICAST_0 |
|  |  | ... |
|  |  | MULTICAST_N |

1204-1207. The WLAN station STA sets up a connection with the AC through the AP.

1208-1211. The WLAN station STA authenticates the identity of the AC.

1212. The WLAN station STA sends an IGMP REPORT message to the AP.

In this embodiment, after receiving the IGMP REPORT message sent by the WLAN station, a multicast group of a specified SSID of the AP performs multicast control according to the created multicast control table.

Figure 13:
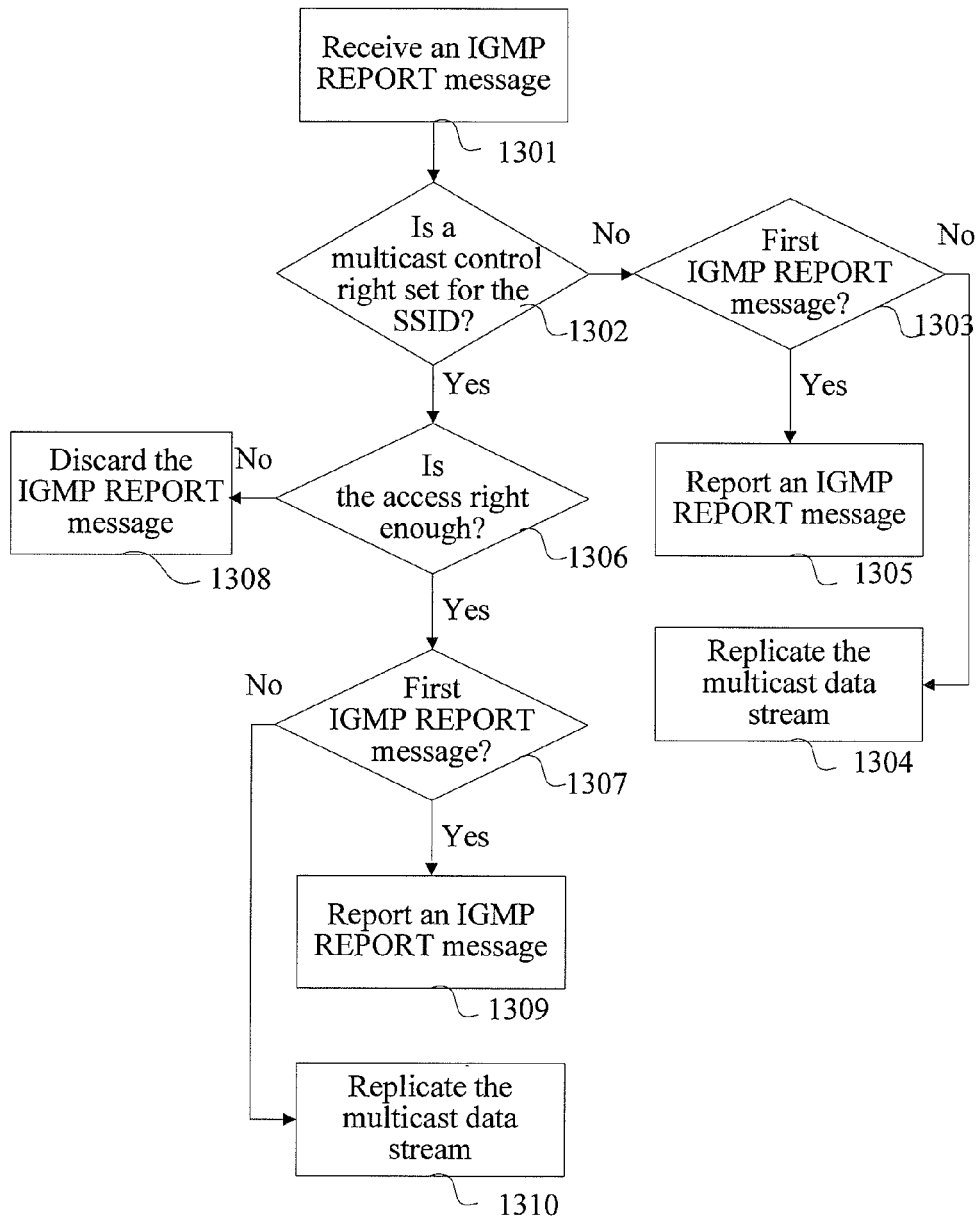
FIG. 13 is a flowchart of multicast control performed by an AP according to an embodiment of the present disclosure.

According to an implementation of this embodiment, the AP deploys an IGMP PROXY, and therefore, the multicast control performed by the AP may be implemented according to the flowchart shown in FIG. 13. Referring to FIG. 13, the procedure includes:

1301. The AP receives the IGMP REPORT message sent by the WLAN station.

1302. By searching the multicast control table, the AP determines whether a multicast control right is set for the SSID. If no multicast control right is set for the SSID, the AP executes step 1303; if a multicast control right is set for the SSID, the AP executes step 1306.

1303. The AP determines whether the message is the first IGMP REPORT message received by the specified multicast group of the specified SSID; if not, the AP executes step 1304; if so, the AP executes step 1305.

1304. The AP replicates the multicast data stream to the WLAN station directly.

1305. The AP sends the IGMP REPORT message to the AC directly, and the AC creates multicast entries, and transmits the multicast data stream from a multicast server to the AP.

1306. The AP checks whether the multicast group of the IGMP REPORT message falls within the scope of the multicast group accessible by the SSID, namely, whether the WLAN station has a right of accessing the multicast group. If the multicast group of the IGMP REPORT message falls within the scope of the multicast group accessible by the SSID, the AP executes step 1307; otherwise, the AP executes step 1308.

1307. The AP determines whether the IGMP REPORT message is the first IGMP REPORT message received by the specified multicast group of the specified SSID; if so, the AP executes step 1309; if not, the AP executes step 1310.

1308. The AP discards the IGMP REPORT message.

1309. The AP sends the IGMP REPORT message to the AC directly, and the AC is responsible for transmitting the multicast data stream from the multicast server to the AP.

1310. The AP replicates the multicast data stream to the WLAN station directly.

According to another implementation of this embodiment, the AP deploys IGMP SNOOPING, and therefore, the multicast control performed by the AP is slightly different from the method shown in FIG. 13. In this case, the AP sends every received IGMP REPORT message to the AC if permitted by the multicast control right. That is, according to the determination result in step 1306, if the WLAN station that sends the IGMP REPORT message has a right of accessing the multicast group, the AP reports the IGMP REPORT message to the AC, and the AC transmits the multicast data stream from the multicast server to the AP.

1213. The AP reports the IGMP REPORT message to the AC.

In this embodiment, the AP decides whether to report the IGMP REPORT message to the AC according to the created multicast control table, which has been detailed in step 1212 and is not described herein.

1214. The AC sends the multicast data stream to the STA through the AP.

In this embodiment, after receiving the multicast data stream from the multicast server, the AC sends the data stream to the AP through a CAPWAP tunnel, and the AP implements multicast replication of the data stream to the WLAN station.

In this embodiment, this step may be implemented according to the prior art, and is not described herein.

1215. The AC sends a CAPWAP multicast control message to the AP.

In this embodiment, when the AC needs to update the accessible multicast group address or disable the multicast control policy, the AC may perform this step to send the CAPWAP multicast control message to the AP. The CAPWAP multicast control message includes multicast control update information or multicast control disabling information.

In this embodiment, when the AC needs to update the accessible multicast group address, the AC may search out all SSIDs that apply the multicast control policy and all APs that deploy the SSID, and send the CAPWAP multicast control message to the APs. The message includes not only the updated multicast group address of each SSID, but also the multicast control update information. In this embodiment, the AC may set its message element value according to Table 4:

TABLE 4

| ACTION | Update multicast control |
|---|---|
| SSID_0 | SSID_0 for which multicast control is updated |
| MULTICAST_LIST_0 | Accessible multicast group address 0 |
| ... | ... |
| SSID_N | SSID_N for which multicast control is updated |
| MULTICAST_LIST_N | Accessible multicast group address N |

In this embodiment, after receiving the CAPWAP multicast control message, the AP updates the locally stored multicast control table according to the multicast control update information in the message. If an accessible multicast group address of an SSID is deleted, the AP deletes the ongoing multicast service at the multicast group address according to the method in this embodiment. When a new WLAN station plays the multicast service on demand, the AP applies the new multicast control policy to the WLAN station, namely, according to the updated multicast control table, the AP performs multicast control on the WLAN station that requests the on-demand multicast service.

In this embodiment, when the AC needs to cancel the multicast control policy of certain SSIDs, namely, disable the multicast control policy of the SSIDs, the AC may search out a list of all APs that deploy the SSIDs, and send a CAPWAP multicast control message to the APs. The message includes not only the to-be-deleted multicast group address of each SSID, but also the multicast control disabling information. In this embodiment, the AC may set the value of the CAPWAP multicast control message element according to Table 5:

TABLE 5

| ACTION | Update multicast control |
|---|---|
| SSID_0 | SSID_0 for which multicast control is updated |
| MULTICAST_LIST_0 | Accessible multicast group address 0 |
| ... | ... |
| SSID_N | SSID_N for which multicast control is updated |
| MULTICAST_LIST_N | Accessible multicast group address N |

In this embodiment, after receiving the CAPWAP multicast control message, the AP deletes the control entry corresponding to the SSID in the locally stored multicast control table according to the multicast control update information in the message. The ongoing multicast service in the SSID is not affected. When a new WLAN station plays the multicast service on demand, the AP does not apply the multicast control policy any more.

In the embodiment shown in FIG. 12, the multicast control granularity of the AP is SSID-based, namely, the WLAN station accessed by each SSID is under control of the rights specified in the multicast control table.

According to another implementation in this embodiment, the multicast control granularity of the AP may also be VAP-based. That is, the AC uses the CAPWAP multicast control message to specify the multicast control granularity of the AP as VAP.

In this implementation, when the AC sends the CAPWAP multicast control message to the AP, the CAPWAP multicast control message element includes not only the original ACTION, SSID, and MULTICAST, but also the BSSID of the VAP. As shown in Table 6, their meanings are:

ACTION: multicast control enabling or multicast control updating or multicast control disabling;

SSID: SSID that enables multicast control or updates multicast control or disables multicast control;

BSSID: BSSID that enables multicast control or updates multicast control or disables multicast control (omissible depending on specific use conditions).

TABLE 6

| ACTION | Enable multicast control |
|---|---|
| BSSID_0 | BSSID_0 of VAP that enables multicast control |
| SSID_0 | SSID_0 for which multicast control is enabled |
| MULTICAST_LIST_0 | Accessible multicast group address 0 |
| ... | ... |
| BSSID_N | BSSID_N of VAP that enables multicast control |
| SSID_N | SSID_N for which multicast control is enabled |
| MULTICAST_LIST_N | Accessible multicast group address N |

In this implementation, after receiving the CAPWAP multicast control message, the AP creates the corresponding multicast control table. The multicast control table includes not only the SSID, the multicast control state of the SSID, and the accessible multicast group address, but also the BSSID.

The AP sets the service set identifier SSID and basic service set identifier BSSID in the CAPWAP multicast control message to the multicast control state, stores the accessible multicast group address in each SSID and each BSSID, and saves the SSID and BSSID, the multicast control states of the SSID and BSSID, and the accessible multicast group address in each SSID and the accessible multicast group address in each BSSID as a multicast control table.

In this implementation, after receiving the IGMP REPORT message sent by the WLAN station accessed by each VAP, the AP determines whether the VAP sets a multicast control right, and whether the WLAN station accessed by the VAP has the right of accessing the specified multicast group. The detailed procedure is the same as the method shown in FIG. 10, and is not described herein.

In this implementation, when the AC needs to update the accessible multicast address of a VAP, in the same way as in the embodiment shown in FIG. 12, the AC sends the CAPWAP multicast control message to the AP. The CAPWAP multicast control message includes multicast control update information. The value of the CAPWAP multicast control message element may be set according to Table 7:

TABLE 7

| ACTION | Update multicast control |
|---|---|
| BSSID_0 | BSSID_0 of VAP that updates multicast control |
| SSID_0 | SSID_0 for which multicast control is updated |
| MULTICAST_LIST_0 | Accessible multicast group address 0 |
| ... | ... |
| BSSID_N | BSSID_N of VAP that updates multicast control |
| SSID_N | SSID_N for which multicast control is updated |
| MULTICAST_LIST_N | Accessible multicast group address N |

The AP updates the locally stored multicast control table according to the SSID and BSSID in the CAPWAP multicast control message, and the accessible multicast group address in each SSID and the accessible multicast group address in each BSSID.

Likewise, if a multicast group right of a BSSID is deleted in the CAPWAP multicast control message, the AP deletes the ongoing multicast service in the BSSID.

In this implementation, when the AC needs to disable the accessible multicast address of a VAP, in the same way as in the embodiment shown in FIG. 12, the AC sends the CAPWAP multicast control message to the AP. The CAPWAP multicast control message includes multicast control disabling information. The value of the CAPWAP multicast control message element may be set according to Table 8:

TABLE 8

| ACTION | Disable multicast control |
|---|---|
| BSSID_0 | BSSID_0 of VAP that disables multicast control |
| SSID_0 | SSID_0 for which multicast control is disabled |
| MULTICAST_LIST_0 | Accessible multicast group address 0 |
| ... | ... |
| BSSID_N | BSSID_N of VAP that disables multicast control |
| SSID_N | SSID_N for which multicast control is disabled |
| MULTICAST_LIST_N | Accessible multicast group address N |

The AP deletes the multicast control entries corresponding to the SSID and BSSID in the locally stored multicast control table according to the SSID and BSSID in the CAPWAP multicast control message, and the accessible multicast group address in each SSID and the accessible multicast group address in each BSSID.

With the multicast control method in this embodiment, the AC manages and controls the APs in a centralized way, and delivers the multicast control policy to the APs. Therefore, the APs implement multicast control and multicast replication locally, which relieves the multicast control and multicast replication pressure on the AC effectively, improves the utilization of the network bandwidth, and overcomes the operator's difficulties in meeting multicast service requirements in the WLAN thoroughly.

Figure 14:
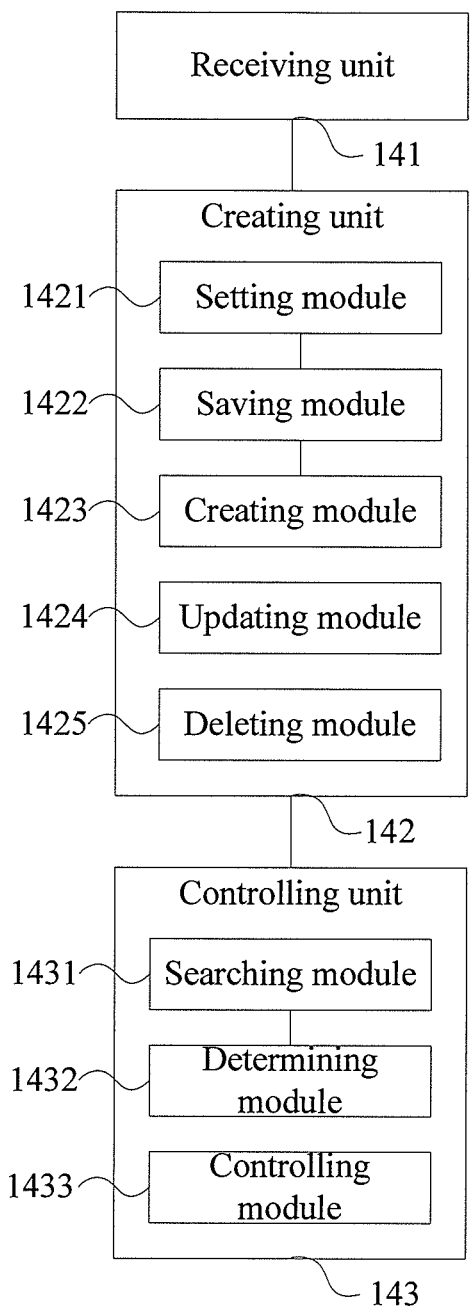
FIG. 14 is a structural block diagram of a multicast control apparatus provided in an embodiment of the present disclosure.

FIG. 14 is a structural block diagram of a multicast control apparatus provided in an embodiment of the present disclosure. Referring to FIG. 14, the apparatus includes:

a receiving unit 141, configured to receive a CAPWAP multicast control message sent by an AC;

a creating unit 142, configured to create a multicast control table according to the CAPWAP multicast control message; and a controlling unit 143, configured to perform multicast control according to the multicast control table.

According to an implementation of this embodiment, the CAPWAP multicast control message received by the receiving unit 141 includes multicast control enabling information, and therefore, in this implementation, the creating unit 142 may further include:

a setting module 1421, configured to: if the SSID in the CAPWAP multicast control message enables the multicast control function, set the SSID in the CAPWAP multicast control message to a multicast control state; if the BSSID of the specified VAP in the CAPWAP multicast control message enables the multicast control function, set the SSID and the BSSID of the specified VAP in the CAPWAP multicast control message to a multicast control state;

a saving module 1422, configured to: if the SSID in the CAPWAP multicast control message enables the multicast control function, save the accessible multicast group address in each SSID; if the BSSID of the specified VAP in the CAPWAP multicast control message enables the multicast control function, save the accessible multicast group address in each SSID and the accessible multicast group address in the BSSID of the specified VAP; and a creating module 1423, configured to: if the SSID in the CAPWAP multicast control message enables the multicast control function, save the SSID, the multicast control state of the SSID, and the accessible multicast group address in each SSID as a multicast control table; or, if the BSSID of the specified VAP in the CAPWAP multicast control message enables the multicast control function, save the SSID, the BSSID of the specified VAP, the multicast control states of the SSID and the multicast control states of the BSSID of the specified VAP, and the accessible multicast group address in each SSID and the accessible multicast group address in the BSSID of the specified VAP as a multicast control table.

According to another implementation of this embodiment, the CAPWAP multicast control message received by the receiving unit 141 includes multicast control update information, and therefore, in this implementation, the creating unit 142 may further include:

an updating module 1424, configured to: update the locally stored multicast control table according to the SSID in the CAPWAP multicast control message and the accessible multicast group address in each SSID if the SSID in the CAPWAP multicast control message enables the multicast control function; and/or update the locally stored multicast control table according to the SSID in the CAPWAP multicast control message and the BSSID of the specified VAP in the CAPWAP multicast control message, and the accessible multicast group address in each SSID and the accessible multicast group address in the BSSID of the specified VAP, if the BSSID of the specified VAP in the CAPWAP multicast control message enables the multicast control function.

According to another implementation of this embodiment, the CAPWAP multicast control message received by the receiving unit 141 includes multicast control disabling information, and therefore, in this implementation, the creating unit 142 includes:

a deleting module 1425, configured to: delete the control entry corresponding to the SSID in the locally stored multicast control table according to the SSID in the CAPWAP multicast control message and the accessible multicast group address in each SSID if the SSID in the CAPWAP multicast control message enables the multicast control function; or delete the control entry corresponding to the BSSID of the specified VAP in the locally stored multicast control table according to the SSID in the CAPWAP multicast control message and the BSSID of the specified VAP in the CAPWAP multicast control message, and the accessible multicast group address in each SSID and the accessible multicast group address in the BSSID of the specified VAP, if the BSSID of the specified VAP in the CAPWAP multicast control message enables the multicast control function.

According to an implementation of this embodiment, the controlling unit 143 includes:

a searching module 1431, configured to search the multicast control table if an Internet Group Management Protocol IGMP Report message is received from a wireless local area network WLAN station;

a determining module 1432, configured to: according to the multicast control table, determine whether a multicast control right is set for the SSID or the BSSID of the specified VAP, where the SSID or BSSID is specified by the IGMP Report message; and a controlling module 1433, configured to perform multicast control according to the determination result of the determining module 1432 and decide whether the WLAN station is entitled to access the desired multicast group.

Each component of the apparatus in this embodiment implements each step of the method of the embodiments shown in FIG. 11 to FIG. 13 respectively. Because the steps have been detailed in the foregoing embodiments, they are not described herein.

With the multicast control apparatus in this embodiment, the AP implements multicast control and multicast replication locally according to the multicast control policy received from the AC, which relieves the multicast control and multicast replication pressure on the AC effectively, improves the utilization of the network bandwidth, and overcomes the operator's difficulties in meeting multicast service requirements in the WLAN thoroughly.

Figure 15:
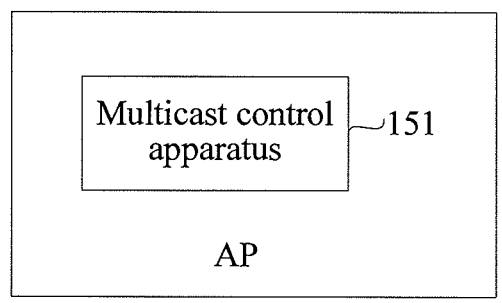
FIG. 15 is a structural block diagram of an access point device AP provided in an embodiment of the present disclosure.

FIG. 15 is a structural block diagram of an access point device AP provided in an embodiment of the present disclosure. Referring to FIG. 15, the access point device AP includes a multicast control apparatus 151 in addition to the components and functions of the existing AP.

In this embodiment, the multicast control apparatus may be the multicast control apparatus shown in FIG. 14. Because the embodiment shown in FIG. 14 has detailed the apparatus, the apparatus is not described herein.

The AP in this embodiment implements multicast control and multicast replication locally according to the multicast control policy received from the AC, which relieves the multicast control and multicast replication pressure on the AC effectively, improves the utilization of the network bandwidth, and overcomes the operator's difficulties in meeting multicast service requirements in the WLAN thoroughly.

The methods or steps of algorithms described herein may be implemented through hardware directly or through a software module executed by a processor, or through both of them. The software module can reside in a random access memory (RAM), a memory, a read-only memory (ROM), an electrically programmable ROM, an electrically erasable programmable ROM, a register, a hard disk, a removable disk, a CD-ROM, or any other form of storage medium well known in the art.

The embodiments above clarify the objectives, technical solutions, and benefits of the present disclosure in detail. Although the disclosure has been described through some exemplary embodiments, the disclosure is not limited to such embodiments. It is apparent that those skilled in the art can make modifications and variations to the disclosure without departing from the spirit and scope of the disclosure. The disclosure is intended to cover the modifications and variations provided that they fall within the scope of protection defined by the following claims or equivalents thereof.

What is claimed is:

1. A multicast control method, for use when a service set identifier (SSID) or a basic service set identifier (BSSID) of a specified virtual access point (VAP) that will be delivered to an access point (AP) enables a multicast control function, the method comprising:
   sending, by an access control point (AC) to the AP, a control and provisioning of wireless access point (CAPWAP) multicast control message comprising multicast control enabling information;
   creating, by the AP, a multicast control table according to the CAPWAP multicast control message;
   performing multicast control according to the multicast control table and
   wherein creating, by the AP, a multicast control table according to the CAPWAP multicast control message comprises one of the following;
      setting, by the AP, the SSID in the CAPWAP multicast control message to a multicast control state if the SSID enables the multicast control function, storing an accessible multicast group address in each SSID, and saving the SSID, the multicast control state of the SSID, and the accessible multicast group address in each SSID as a multicast control table, and
      setting, by the AP, the SSID and the BSSID of the specified VAP in the CAPWAP multicast control message to a multicast control state if the BSSID enables the multicast control function, storing the accessible multicast group address in each SSID and each BSSID, and saving the SSID, the BSSID of the specified VAP, the multicast control states of the SSID and the multicast control states of the BSSID of the specified VAP, and the accessible multicast group address in each SSID and the accessible multicast group address in the BSSID of the specified VAP as a multicast control table.

2. The method according to claim 1, further comprising one of the following:
   searching, by the AC, for all SSIDs that apply the multicast group address, and a list of all APs that deploy the SSIDs when updating an accessible multicast group address of the SSID if the SSID enables the multicast control function, and sending the CAPWAP multicast control message that comprises multicast control update information to APs in the AP list, so that the APs update locally stored multicast control tables of the APs according to the CAPWAP multicast control message that comprises the multicast control update information; and
   searching, by the AC, for all the B S SIDS of the specified VAP that apply the accessible multicast group address, and a list of all APs that deploy the BSSIDs of the specified VAP when updating the accessible multicast group address of the BSSID of the specified VAP if the BSSID enables the multicast control function, and sending the CAPWAP multicast control message that comprises multicast control update information to APs in the AP list, so that the APs update the locally stored multicast control tables of the APs according to the CAPWAP multicast control message that comprises the multicast control update information.

3. The method according to claim 2, wherein:
   updating, by the APs, the locally stored multicast control tables of the APs according to the CAPWAP multicast control message that comprises the multicast control update information comprises one of the following:
      updating, by the APs, the locally stored multicast control tables of the APs according to the SSID in the CAPWAP multicast control message and the accessible multicast group address in each SSID if the SSID enables the multicast control function; and
      updating, by the APs, the locally stored multicast control tables of the APs according to the SSID in the CAPWAP multicast control message, the BSSID of the specified VAP, and the accessible multicast group address in each SSID and the BSSID of the specified VAP if the BSSID enables the multicast control function.

4. The method according to claim 3, wherein:
   an on-demand service of the multicast group in the SSID or the BSSID of the specified VAP is terminated if an on-demand right of a multicast group of the SSID or the BSSID of the specified VAP is deleted in the CAPWAP multicast control message.

5. The method according to claim 1, further comprising:
   searching, by the AC, for a list of all APs that deploy the SSID or BSSID of the specified VAP when disabling the multicast control policy of the SSID or the BSSID of the specified VAP if the BSSID enables the multicast control function, and sending the CAPWAP multicast control message that comprises multicast control disabling information to APs in the AP list, so that the APs modify the locally stored multicast control tables of the APs according to the CAPWAP multicast control message that comprises the multicast control disabling information.

6. The method according to claim 5, wherein:
   modifying, by the APs, the locally stored multicast control tables of the APs according to the CAPWAP multicast control message that comprises the multicast control disabling information comprises one of the following:
      deleting, by the AP, a multicast control entry corresponding to the SSID in the locally stored multicast control tables of the APs according to the SSID in the CAPWAP multicast control message and the accessible multicast group address in each SSID if the SSID enables the multicast control function; and
      deleting, by the AP, the multicast control entry corresponding to the BSSID of the specified VAP in the locally stored multicast control tables of the APs according to the SSID in the CAPWAP multicast control message, the BSSID of the specified VAP, and the accessible multicast group address in each SSID and the BSSID of the specified VAP if the BSSID enables the multicast control function.

7. A multicast control apparatus, comprising:
   a first determining unit, configured to determine whether a service set identifier (SSID) or a basic service set identifier (BSSID) of a specified virtual access point (VAP) that will be delivered to an access point (AP) enables controllable multicast;
   a first sending unit, configured to: if the first determining unit determines that the SSID or the BSSID of the specified VAP that will be delivered to the AP enables the controllable multicast, send a control and provisioning of wireless access point (CAPWAP) multicast control message that comprises multicast control enabling information to the AP, so that the AP creates a multicast control table according to the CAPWAP multicast control message that comprises the multicast control enabling information and performs multicast control according to the multicast control table;

a second determining unit, configured to determine whether to update an accessible multicast group address of the SSID or the BSSID of the specified VAP;

a first searching unit, configured to: if the second determining unit determines it is necessary to update the accessible multicast group address of the SSID, search for the BSSIDs of all SSIDs that apply the multicast group address and a list of all APs that deploy the SSIDs; and/or, if the second determining unit determines it is necessary to update the accessible multicast group address of the BSSID of the specified VAP, search for all the BSSIDs of the specified VAP that apply the multicast group address, and a list of all APs that deploy the BSSIDs of the specified VAP; and a second sending unit, configured to: send a CAPWAP multicast control message that comprises multicast control update information to the APs in the AP list according to a search result of the first searching unit, so that the APs update locally stored multicast control tables of the APs according to the CAPWAP multicast control message that comprises the multicast control update information.

8. The apparatus according to claim 7, further comprising:
a third determining unit, configured to determine whether to disable a multicast control policy of the SSID or the BSSID of the specified VAP;

a second searching unit, configured to: if the third determining unit determines it is necessary to disable the multicast control policy of the SSID, search for a list of all APs that deploy the SSID; and/or, if the third determining unit determines it is necessary to disable the multicast control policy of the BSSID of the specified VAP, search for a list of all APs that deploy the BSSID of the specified VAP; and a third sending unit, configured to: send a CAPWAP multicast control message that comprises multicast control disabling information to the APs in the AP list according to a search result of the second searching unit, so that the APs modify locally stored multicast control tables of the APs according to the CAPWAP multicast control message that comprises the multicast control disabling information.

9. An access control point device, comprising a multicast control apparatus, wherein the multicast control apparatus comprises:

a first determining unit, configured to determine whether a service set identifier (SSID) or a basic service set identifier (BSSID) of a specified virtual access point (VAP) that will be delivered to an access point (AP) enables controllable multicast;

a first sending unit, configured to: if the first determining unit determines that the SSID or the BSSID of the specified VAP that will be delivered to the AP enables the controllable multicast, send a control and provisioning of wireless access point (CAPWAP) multicast control message that comprises multicast control enabling information to the AP, so that the AP creates a multicast control table according to the CAPWAP multicast control message that comprises the multicast control enabling information and performs multicast control according to the multicast control table;

a second determining unit, configured to determine whether to update an accessible multicast group address of the SSID or the BSSID of the specified VAP;

a first searching unit, configured to: if the second determining unit determines it is necessary to update the accessible multicast group address of the SSID, search for the BSSIDs of all SSIDs that apply the multicast group address and a list of all APs that deploy the SSIDs; and/or, if the second determining unit determines it is necessary to update the accessible multicast group address of the BSSID of the specified VAP, search for all the BSSIDs of the specified VAP that apply the multicast group address, and a list of all APs that deploy the BSSIDs of the specified VAP; and a second sending unit, configured to: send a CAPWAP multicast control message that comprises multicast control update information to the APs in the AP list according to a search result of the first searching unit, so that the APs update locally stored multicast control tables of the APs according to the CAPWAP multicast control message that comprises the multicast control update information.

10. The apparatus according to claim 9, wherein the multicast control apparatus further comprises:
a third determining unit, configured to determine whether to disable a multicast control policy of the SSID or the BSSID of the specified VAP;

a second searching unit, configured to: if the third determining unit determines it is necessary to disable the multicast control policy of the SSID, search for a list of all APs that deploy the SSID; and/or, if the third determining unit determines it is necessary to disable the multicast control policy of the BSSID of the specified VAP, search for a list of all APs that deploy the BSSID of the specified VAP; and a third sending unit, configured to: send a CAPWAP multicast control message that comprises multicast control disabling information to the APs in the AP list according to a search result of the second searching unit, so that the APs modify locally stored multicast control tables of the APs according to the CAPWAP multicast control message that comprises the multicast control disabling information.

11. A multicast control method, comprising:
receiving, by an access point (AP), a control and provisioning of wireless access point (CAPWAP) multicast control message sent by an access control point (AC);

creating, by the access point (AP), a multicast control table according to the CAPWAP multicast control message;

performing, by the AP, multicast control according to the multicast control table; and if the CAPWAP multicast control message comprises multicast control enabling information, the creating, by the AP, the multicast control table according to the CAPWAP multicast control message comprises:

setting, by the AP, a service set identifier (SSID) in the CAPWAP multicast control message to a multicast control state, and saving an accessible multicast group address in each SSID; or, setting the SSID and a basic service set identifier (BSSID) of a specified virtual access point (VAP) in the CAPWAP multicast control message to the multicast control state, and saving the accessible multicast group address in each SSID and each BSSID; and correspondingly, saving, by the AP, the SSID, the multicast control state of the SSID, and the accessible multicast group address in each SSID as a multicast control table; or, saving the SSID, the BSSID of the specified VAP, the multicast control states of the SSID and the BSSID of the specified VAP, and the accessible multicast group address in each SSID and the BSSID of the specified VAP as a multicast control table.

12. A multicast control method, comprising:
receiving, by an access point (AP), a control and provisioning of wireless access point (CAPWAP) multicast control message sent by an access control point (AC);
creating, by the access point (AP), a multicast control table according to the CAPWAP multicast control message;
performing, by the AP, multicast control according to the multicast control table; and
if the CAPWAP multicast control message comprises multicast control update information, creating, by the AP, the multicast control table according to the CAPWAP multicast control message comprises:
 updating, by the AP, a locally stored multicast control table according to an S SID in the CAPWAP multicast control message and an accessible multicast group address in each SSID, or
 updating, by the AP, the locally stored multicast control table according to the SSID and a BSSID of a specified VAP in the CAPWAP multicast control message, and the accessible multicast group address in each SSID and the BSSID of the specified VAP.

13. The method according to claim 12, wherein:
if an on-demand right of a multicast group of the SSID is deleted in the CAPWAP multicast control message, the AP terminates an on-demand service of the multicast group in the SSID; or
if an on-demand right of a multicast group of the BSSID of the specified VAP is deleted in the CAPWAP multicast control message, the AP terminates an on-demand service of the multicast group in the BSSID of the specified VAP.

14. A multicast control method, comprising:
receiving, by an access point (AP), a control and provisioning of wireless access point (CAPWAP) multicast control message sent by an access control point (AC);
creating, by the access point (AP), a multicast control table according to the CAPWAP multicast control message;
performing, by the AP, multicast control according to the multicast control table; and
if the CAPWAP multicast control message comprises multicast control disabling information, the creating, by the AP, the multicast control table according to the CAPWAP multicast control message comprises one of the following:
 deleting, by the AP, a control entry corresponding to an SSID in a locally stored multicast control table according to the SSID in the CAPWAP multicast control message and an accessible multicast group address in each SSID; or
 deleting, by the AP, a control entry corresponding to a BSSID of a specified VAP in the locally stored multicast control table according to the SSID and the BSSID of the specified VAP in the CAPWAP multicast control message, and the accessible multicast group address in each SSID and the BSSID of the specified VAP.

15. A multicast control method, comprising:
receiving, by an access point (AP), a control and provisioning of wireless access point (CAPWAP) multicast control message sent by an access control point (AC);
creating, by the access point (AP), a multicast control table according to the CAPWAP multicast control message; and
performing, by the AP, multicast control according to the multicast control table, comprising,
 searching, by the AP, the multicast control table if an Internet Group Management Protocol (IGMP) Report message is received from a wireless local area network (WLAN) station, and
 determining, by the AP according to the multicast control table, whether a multicast control right is set for an SSID or a BSSID specified by the IGMP Report message, and, according to a result of the determination, performing multicast control and deciding whether the WLAN station is entitled to access a desired multicast group.

16. A multicast control apparatus, comprising:
a receiving unit, configured to receive a control and provisioning of wireless access point (CAPWAP) multicast control message sent by an access control point (AC);
a creating unit, configured to create a multicast control table according to the CAPWAP multicast control message;
a controlling unit, configured to perform multicast control according to the multicast control table; and
if the CAPWAP multicast control message received by the receiving unit comprises multicast control enabling information, the creating unit comprises:
 a setting module, configured to: if a service set identifier (SSID) in the CAPWAP multicast control message enables a multicast control function, set the SSID in the CAPWAP multicast control message to a multicast control state; if a basic service set identifier (BSSID) of a specified virtual access point (VAP) in the CAPWAP multicast control message enables the multicast control function, set the SSID and the BSSID of the specified VAP in the CAPWAP multicast control message to the multicast control state,
 a saving module, configured to: if the SSID in the CAPWAP multicast control message enables the multicast control function, save an accessible multicast group address in each SSID; if the BSSID of the specified VAP in the CAPWAP multicast control message enables the multicast control function, save the accessible multicast group address in each SSID and the BSSID of the specified VAP, and
 a creating module, configured to: if the SSID in the CAPWAP multicast control message enables the multicast control function, save the S SID, the multicast control state of the SSID, and the accessible multicast group address in each SSID as a multicast control table; or, if the BSSID of the specified VAP in the CAPWAP multicast control message enables the multicast control function, save the SSID, the BSSID of the specified VAP, the multicast control states of the SSID and the BSSID of the specified VAP, and the accessible multicast group address in each SSID and the BSSID of the specified VAP as a multicast control table.

17. A multicast control apparatus, comprising:
a receiving unit, configured to receive a control and provisioning of wireless access point (CAPWAP) multicast control message sent by an access control point (AC);
a creating unit, configured to create a multicast control table according to the CAPWAP multicast control message;
a controlling unit, configured to perform multicast control according to the multicast control table; and
if the CAPWAP multicast control message received by the receiving unit comprises multicast control update information, the creating unit comprises one or more of the following:
 an first updating module, configured to: update a locally stored multicast control table according to an SSID in the CAPWAP multicast control message and an accessible multicast group address in each SSID if the SSID in the CAPWAP multicast control message enables a multicast control function, and a second updating module, configured to: update the locally stored multicast control table according to the SSID and a BSSID of a specified VAP in the CAPWAP multicast control message and according to the accessible multicast group address in each SSID and the BSSID of the specified VAP if the BSSID of the specified VAP in the CAPWAP multicast control message enables the multicast control function.

18. A multicast control apparatus, comprising:

a receiving unit, configured to receive a control and provisioning of wireless access point (CAPWAP) multicast control message sent by an access control point (AC);

a creating unit, configured to create a multicast control table according to the CAPWAP multicast control message;

a controlling unit, configured to perform multicast control according to the multicast control table; and if the CAPWAP multicast control message received by the receiving unit comprises multicast control disabling information, the creating unit comprises one of the following:

a first deleting module, configured to: delete a control entry corresponding to an SSID in the locally stored multicast control table according to the SSID in the CAPWAP multicast control message and each SSID or an accessible multicast group address in each SSID if the SSID in the CAPWAP multicast control message enables the multicast control function, and a second deleting module, configured to: delete a control entry corresponding to a BSSID of a specified VAP in the locally stored multicast control table according to the SSID and the BSSID of the specified VAP in the CAPWAP multicast control message and according to the accessible multicast group address in each SSID and the BSSID of the specified VAP if the BSSID of the specified VAP in the CAPWAP multicast control message enables the multicast control function.

19. A multicast control apparatus, comprising:

a receiving unit, configured to receive a control and provisioning of wireless access point (CAPWAP) multicast control message sent by an access control point (AC);

a creating unit, configured to create a multicast control table according to the CAPWAP multicast control message; and a controlling unit, configured to perform multicast control according to the multicast control table, the controlling unit comprising, a searching module, configured to search the multicast control table if an Internet Group Management Protocol (IGMP) Report message is received from a wireless local area network (WLAN) station, a determining module, configured to: according to the multicast control table, determine whether a multicast control right is set for an SSID or a BSSID specified by the IGMP Report message, and a controlling module, configured to perform multicast control according to a determination result of the determining module and decide whether the WLAN station is entitled to access a desired multicast group.

20. An access point device, comprising a multicast control apparatus, wherein the multicast control apparatus comprises:

a receiving unit, configured to receive a control and provisioning of wireless access point (CAPWAP) multicast control message sent by an access control point (AC);

a creating unit, configured to create a multicast control table according to the CAPWAP multicast control message;

a controlling unit, configured to perform multicast control according to the multicast control table; and if the CAPWAP multicast control message received by the receiving unit comprises multicast control enabling information, the creating unit comprises:

a setting module, configured to: if a service set identifier (SSID) in the CAPWAP multicast control message enables a multicast control function, set the SSID in the CAPWAP multicast control message to a multicast control state; if a basic service set identifier (BSSID) of a specified virtual access point (VAP) in the CAPWAP multicast control message enables the multicast control function, set the SSID and the BSSID of the specified VAP in the CAPWAP multicast control message to the multicast control state, a saving module, configured to: if the SSID in the CAPWAP multicast control message enables the multicast control function, save an accessible multicast group address in each SSID; if the BSSID of the specified VAP in the CAPWAP multicast control message enables the multicast control function, save the accessible multicast group address in each SSID and the BSSID of the specified VAP, and a creating module, configured to: if the SSID in the CAPWAP multicast control message enables the multicast control function, save the SSID, the multicast control state of the SSID, and the accessible multicast group address in each SSID as a multicast control table: or, if the BSSID of the specified VAP in the CAPWAP multicast control message enables the multicast control function, save the SSID, the BSSID of the specified VAP, the multicast control states of the SSID and the BSSID of the specified VAP, and the accessible multicast group address in each SSID and the BSSID of the specified VAP as a multicast control table.

21. An access point device, comprising a multicast control apparatus, wherein the multicast control apparatus comprises:

a receiving unit, configured to receive a control and provisioning of wireless access point (CAPWAP) multicast control message sent by an access control point (AC);

a creating unit, configured to create a multicast control table according to the CAPWAP multicast control message;

a controlling unit, configured to perform multicast control according to the multicast control table; and if the CAPWAP multicast control message received by the receiving unit comprises multicast control update information, the creating unit comprises one or more of the following:

a first updating module, configured to: update a locally stored multicast control table according to an SSID in the CAPWAP multicast control message and an accessible multicast group address in each SSID if the SSID in the CAPWAP multicast control message enables a multicast control function, and a second updating module, configured to: update the locally stored multicast control table according to the SSID and a BSSID of a specified VAP in the CAPWAP multicast control message and according to the accessible multicast group address in each SSID and the BSSID of the specified VAP if the BSSID of the specified VAP in the CAPWAP multicast control message enables the multicast control function.

22. An access point device, comprising a multicast control apparatus, wherein the multicast control apparatus comprises:
   a receiving unit, configured to receive a control and provisioning of wireless access point (CAPWAP) multicast control message sent by an access control point (AC);
   a creating unit, configured to create a multicast control table according to the CAPWAP multicast control message;
   a controlling unit, configured to perform multicast control according to the multicast control table; and
   if the CAPWAP multicast control message received by the receiving unit comprises multicast control disabling information, the creating unit comprises one of the following:
      a first deleting module, configured to: delete a control entry corresponding to an SSID in the locally stored multicast control table according to the SSID in the CAPWAP multicast control message and each SSID or an accessible multicast group address in each SSID if the SSID in the CAPWAP multicast control message enables the multicast control function; and
      a second deleting module, configured to: delete a control entry corresponding to a BSSID of a specified VAP in the locally stored multicast control table according to the SSID and the BSSID of the specified VAP in the CAPWAP multicast control message and according to the accessible multicast group address in each SSID and the BSSID of the specified VAP if the BSSID of the specified VAP in the CAPWAP multicast control message enables the multicast control function.

23. An access point device, comprising a multicast control apparatus, wherein the multicast control apparatus comprises:
   a receiving unit, configured to receive a control and provisioning of wireless access point (CAPWAP) multicast control message sent by an access control point (AC);
   a creating unit, configured to create a multicast control table according to the CAPWAP multicast control message; and
   a controlling unit, configured to perform multicast control according to the multicast control table, the controlling unit comprising,
      a searching module, configured to search the multicast control table if an Internet Group Management Protocol (IGMP) Report message is received from a wireless local area network (WLAN) station,
      a determining module, configured to: according to the multicast control table, determine whether a multicast control right is set for an SSID or a BSSID specified by the IGMP Report message, and
      a controlling module, configured to perform multicast control according to a determination result of the determining module and decide whether the WLAN station is entitled to access a desired multicast group.

24. A multicast control method for use when a service set identifier (SSID) or a basic service set identifier (BSSID) of a specified virtual access point (VAP) that will be delivered to an access point (AP) enables a multicast control function, the method comprising:
   sending, by an access control point (AC) to the AP, a control and provisioning of wireless access point (CAPWAP) multicast control message comprising multicast control enabling information;
   creating, by the AP, a multicast control table according to the CAPWAP multicast control message;
   performing multicast control according to the multicast control table; and
   wherein the method further comprises at least one of the following:
      searching, by the AC, for all SSIDs that apply the multicast group address, and a list of all APs that deploy the SSIDs when updating an accessible multicast group address of the SSID if the SSID enables the multicast control function, and sending the CAPWAP multicast control message that comprises multicast control update information to APs in the AP list, so that the APs update locally stored multicast control tables of the APs according to the CAPWAP multicast control message that comprises the multicast control update information, and
      searching, by the AC, for all the BSSIDs of the specified VAP that apply the accessible multicast group address, and a list of all APs that deploy the BSSIDs of the specified VAP when updating the accessible multicast group address of the BSSID of the specified VAP if the BSSID enables the multicast control function, and sending the CAPWAP multicast control message that comprises multicast control update information to APs in the AP list, so that the APs update the locally stored multicast control tables of the APs according to the CAPWAP multicast control message that comprises the multicast control update information.

* * * * *